July 15, 1958  
C. J. COCHRAN  
2,842,800  
PROCESS FOR CONTINUOUS DRYING, WASHING AND CUTTING OF VINYL SHEETING  
Original Filed Sept. 10, 1954  
6 Sheets-Sheet 3
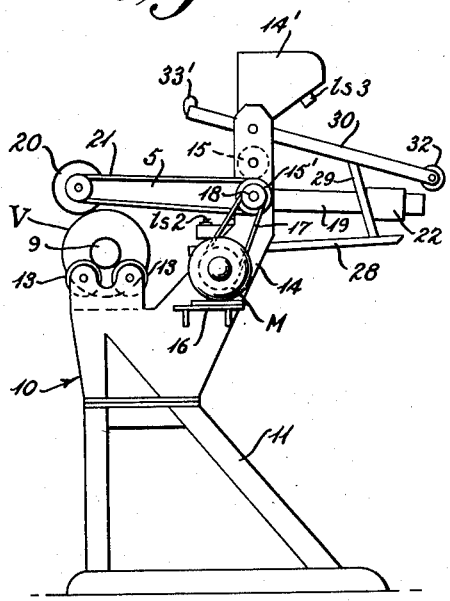
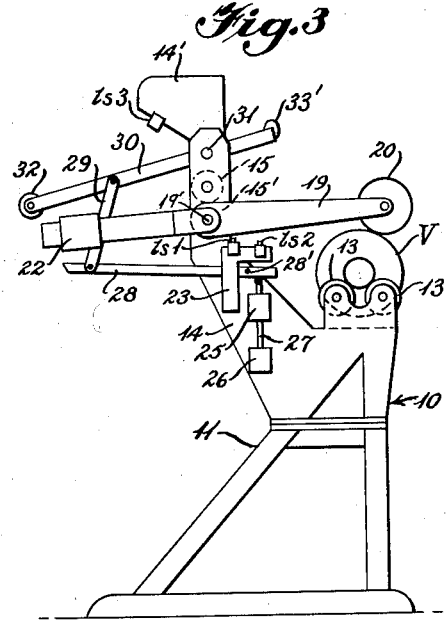
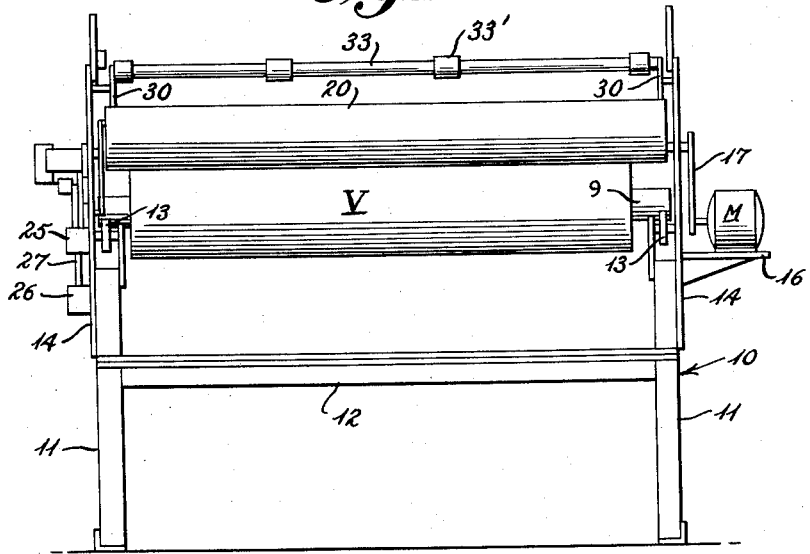
Carl J. Cochran

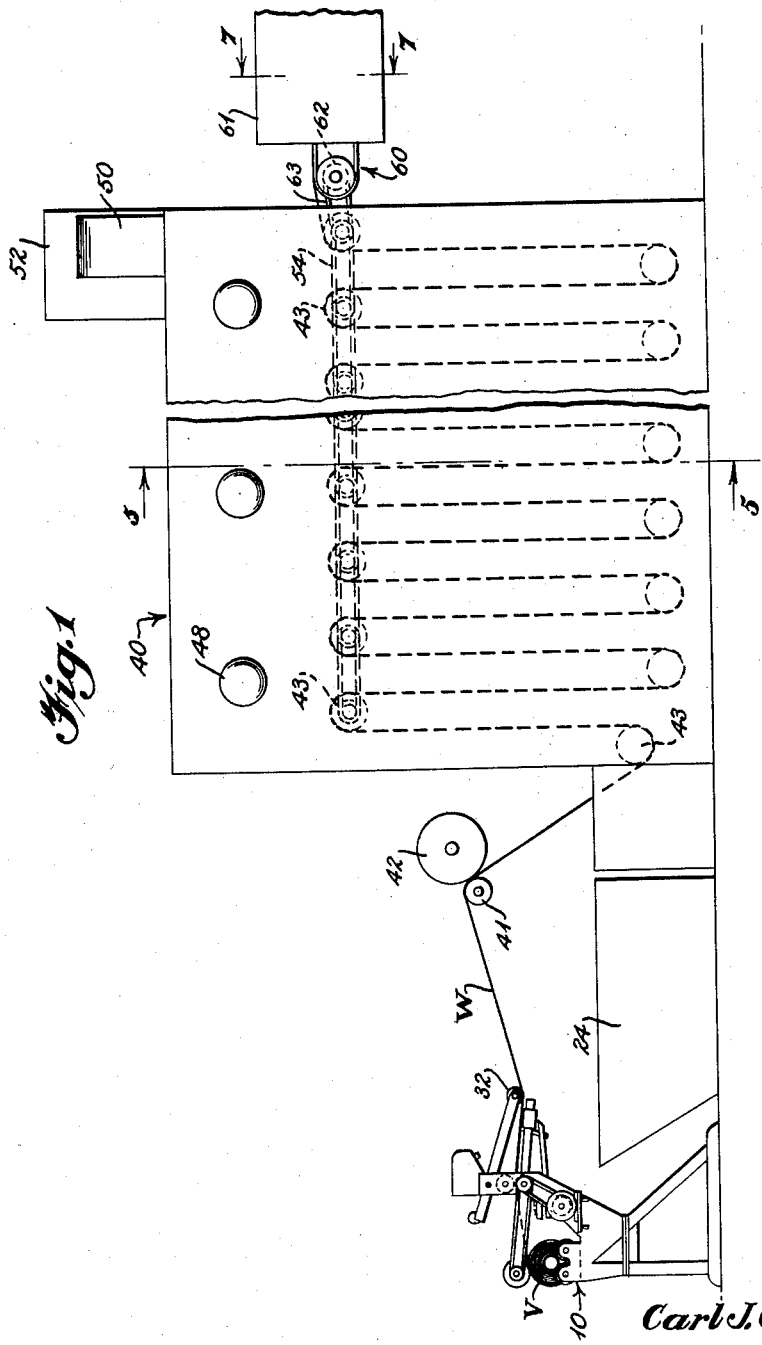

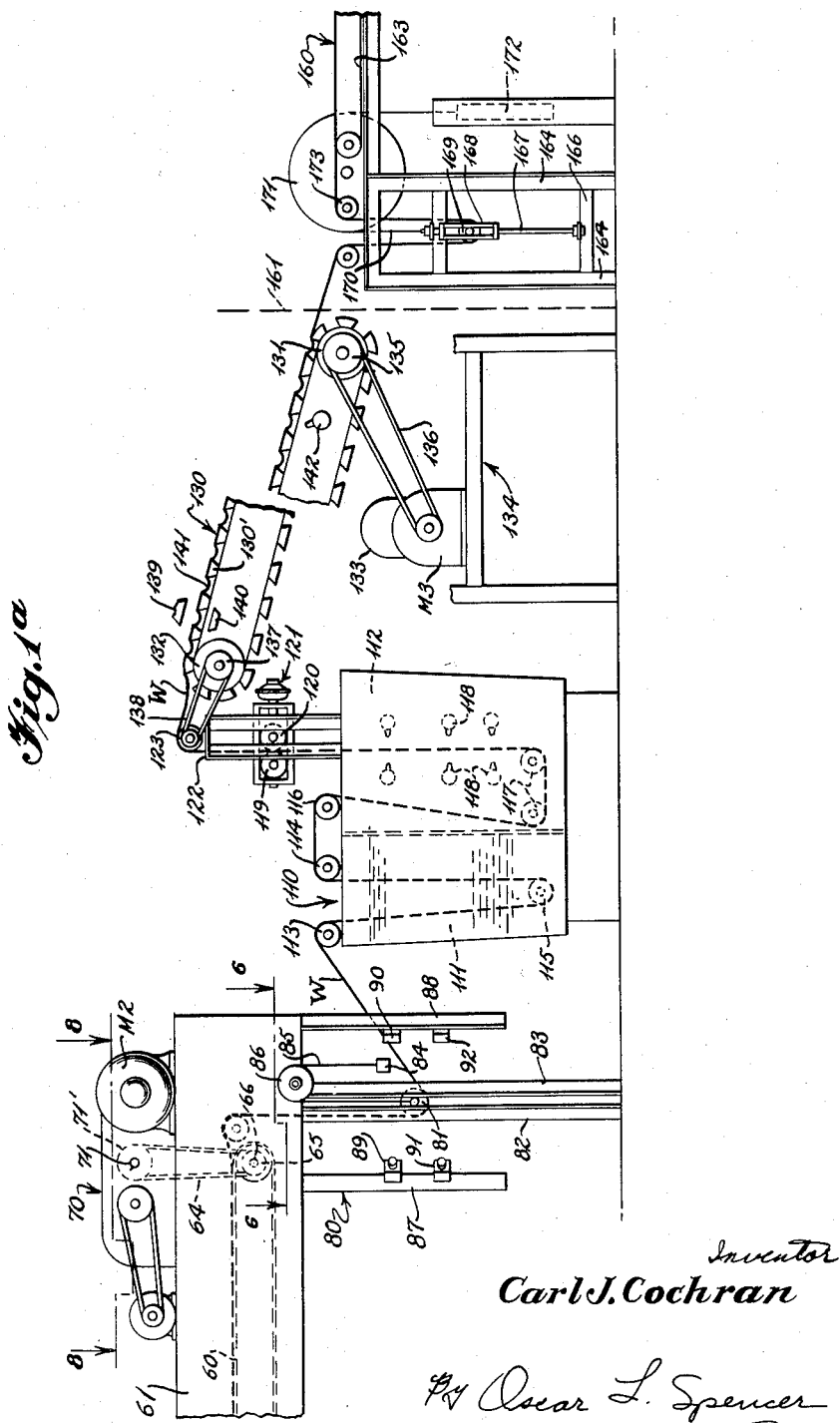

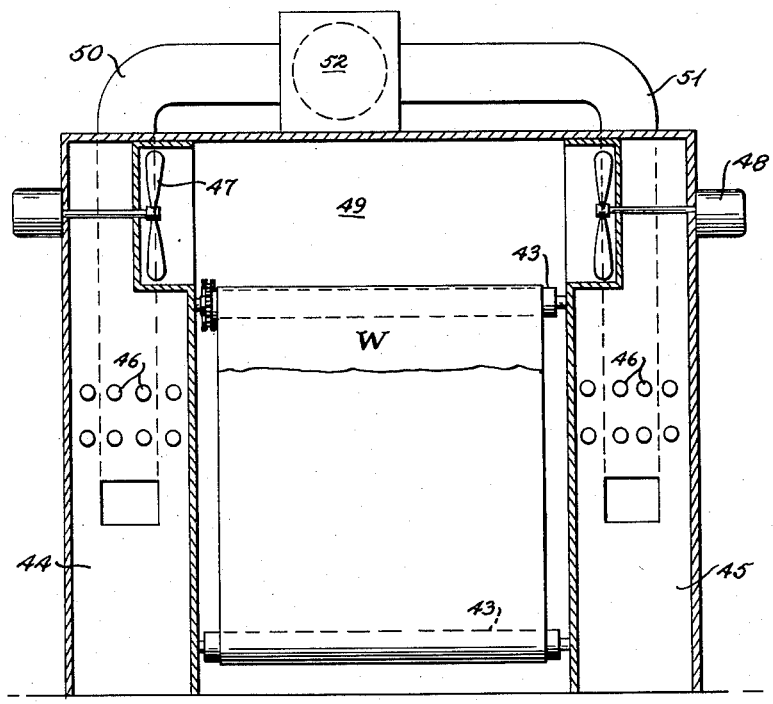
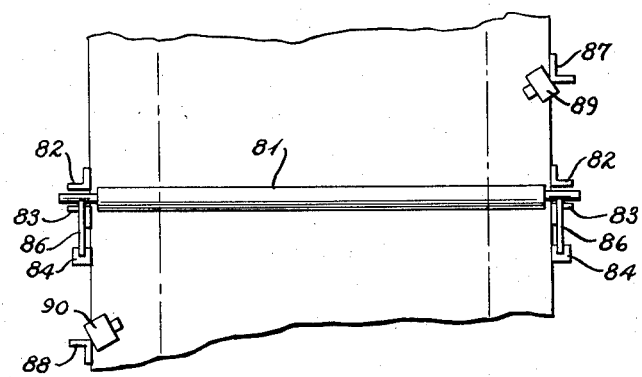

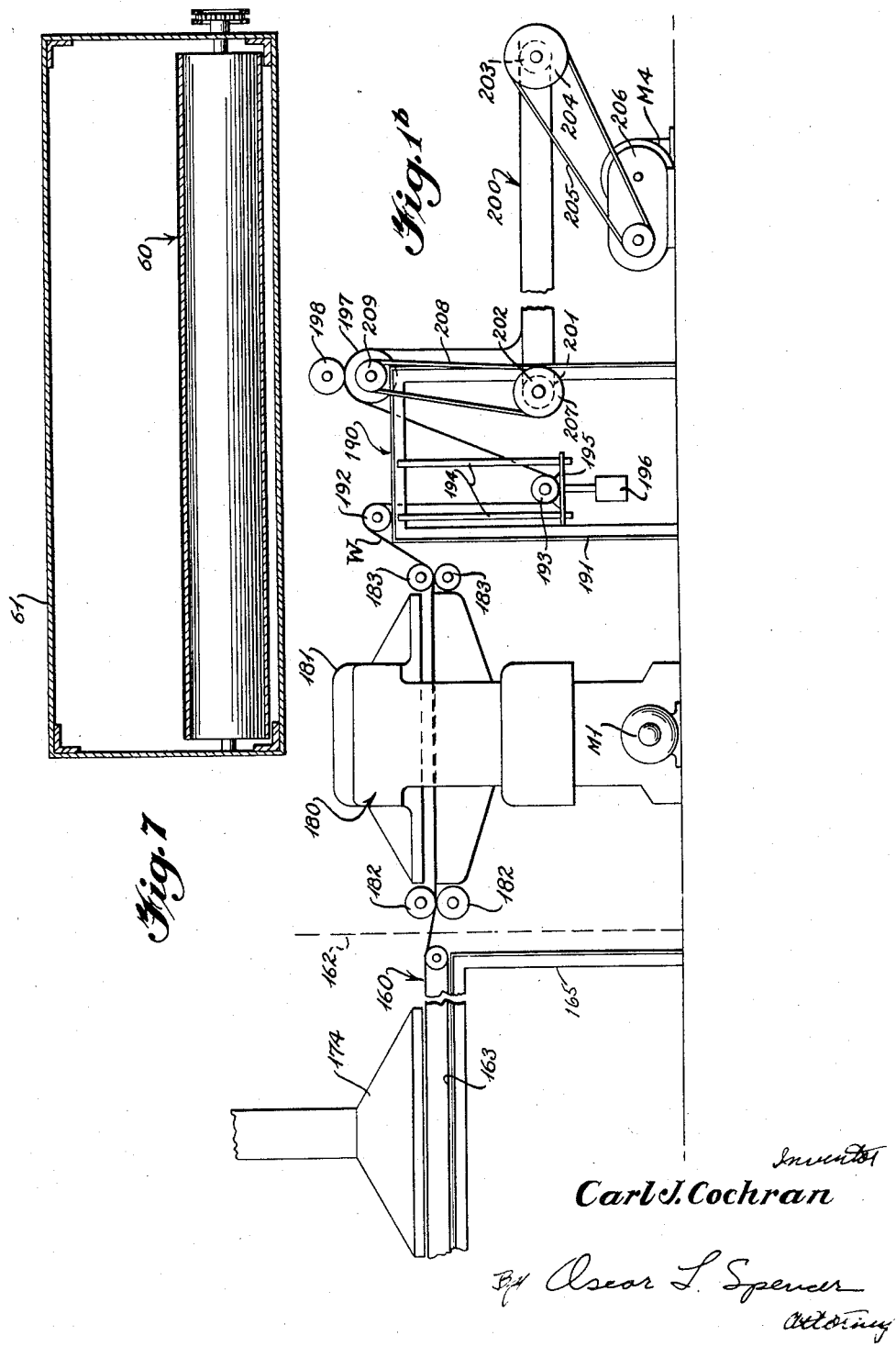

Inventor
Carl J. Cochran
By Oscar L. Spencer
attorney

United States Patent Office 2,842,800
Patented July 15, 1958

2,842,800

PROCESS FOR CONTINUOUS DRYING, WASHING, AND CUTTING OF VINYL SHEETING

Carl J. Cochran, New Kensington, Pa., assignor to Pittsburgh Plate Glass Company, a corporation of Pennsylvania Original application September 10, 1954, Serial No. 455,299, now Patent No. 2,753,592, dated July 10, 1956. Divided and this application February 15, 1956, Serial No. 565,720

5 Claims. (Cl. 18—48)

This invention is directed to the continuous preparation of vinyl sheeting and the cutting out in pattern form insert pieces therefrom. More particularly it is directed to a process for treating a continuous sheet of vinyl sheeting and like plastic material in web form to condition and prepare it as insert pieces for laminated glass. This application is a division of my application Serial Number 455,299, filed September 10, 1954, now U. S. Patent 2,753,592.

Heretofore, three separate operations have been carried out in connection with the preparation of insert pieces to be used with laminated glass; namely, drying of the sheeting has been carried out separately, followed by a separate handling of the vinyl sheet stock to free it from unwanted chemical deposits as by washing and then the stock in a further separate operation has been fed to a die press where it is cut to pattern size. My continuous process for preparing and forming the inserts has provided a uniform quality of insert and has greatly reduced the rejects and at the same time has reduced the cost of preparing the inserts.

An object of my invention is to provide uniform treatment of vinyl and like plastic material provided in sheet or web form which has the transparency and plasticity required for an interlayer for laminated safety glass whereby the web or sheet is uniformly fed at an even tension while being dried, thence it is cooled, it is then washed to soften the web and to remove undesirable surface chemical deposits, then water rinsed to further remove deposits, stripped to remove any rinse or residue fluid thereon, heated to remove moisture and to relax the web, the web is then straightened, fed through a cold zone to chill and set the web following which in its readied and stabilized physical state inserts to serve as interlayers for laminated glass are cut therefrom.

A further object of my invention is to provide for uniform treatment of a vinyl web in a continuous operation so that inserts of uniform quality are cut from the web in the continuous operation.

Still further objects and the entire scope of applicability of the present invention become apparent from the detailed description given hereinafter. It should be understood, however, that the detailed description and specific example is given by way of illustration only, and while indicating the preferred embodiment of the invention, is not given by way of limitation, since various changes and modifications within the spirit and scope of the invention will become apparent to those skilled in the art from this detailed description.

For a more complete understanding of the nature and scope of my invention, reference can be had to the following detailed description taken in connection with the accompanying drawings in which:

Fig. 1 is a side elevation of the feed-in mechanism, the drier and the left-hand end of a first conveyor and cooling zone;

Fig. 1a is a continuation at the right-hand end of Fig. 1 showing the first cooling chamber, the tension control mechanism, the washer, a second conveyor and treating zone and the left-hand end of a third conveyor with tensioning mechanism;

Fig. 1b is a continuation at the right-hand end of Fig. 1a showing the third conveyor and the cooling zone, the die press further tensioning mechanism and a fourth or takeoff conveyor;

Fig. 2 is a side elevation on a large scale of the feed-in mechanism shown at the left-hand end of Fig. 1;

Fig. 3 is a side elevation of the feed-in mechanism of Fig. 2 as viewed from the opposite side;

Fig. 4 is a view of the feed-in mechanism as viewed at the right of Fig. 2;

Fig. 5 is a vertical elevation of the drier along line 5—5 of Fig. 1;

Fig. 6 is a plan view of the tension control mechanism along line 6—6 of Fig. 1a;

Fig. 7 is a vertical sectional view on an enlarged scale of the first cooling chamber and conveyor along line 7—7 of Fig. 1;

Fig. 8 is a plan view of the drive mechanism responsive to the tension control mechanism in Fig. 1a.

Throughout the various figures of the drawings and the description like reference numbers refer to similar parts.

Figure 8:
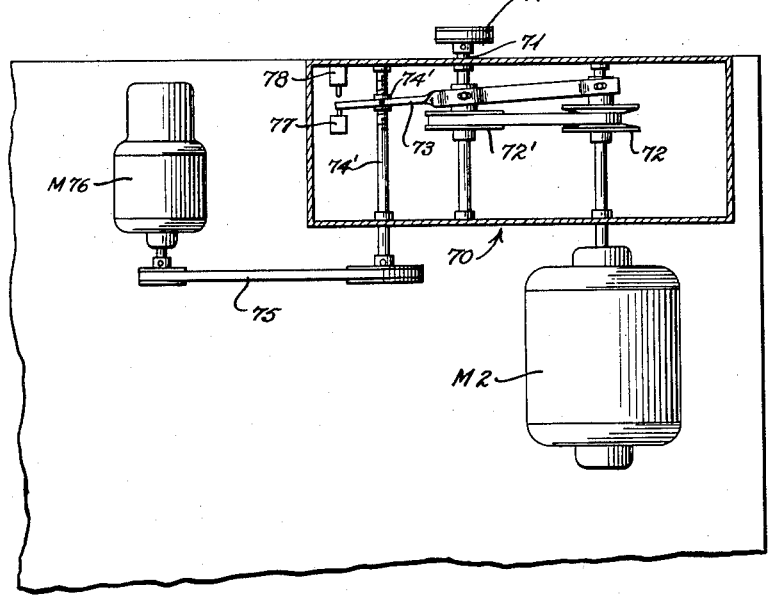

I carry out the treatment of the vinyl web W in a continuous operation. A means for carrying out my continuous process is here described. The web is fed from a roll of stock V by a feed-in frame 10, thence continuously through a drier 40, over a conveyor 60 through cooling chamber 61, through a tension control station 80 where the tension on the web W is maintained uniformly as it enters a washer 110. As the web leaves the washer it is stripped of water by the wringer rolls 119—120 and is carried by a drying and cooling conveyor 130 to a cooling room 160 where it is chilled and set. The web after leaving the chill room 160 has inserts in pattern form cut therefrom by a die press 180 and after leaving the press the web is carried by a take-off conveyor 200 where the insets are stripped from the balance of the web. This continuous operation of treating the vinyl sheet and cutting it in the line of operation affords a uniform quality of insert as contrasted with interrupted operation of separate drying, washing, and cutting.

Feed-in frame

A feed-in frame or mechanism is generally indicated at 10 in Figs. 1–4 and it has an angle iron support frame 11 consisting of an A-like framework at each end with transverse members 12. Each of the A-frames 11 support spaced apart bed rollers 13—13 on which is mounted the mandrel 9 which protrudes at each end from the roll of vinyl stock V. The A-like frames at each end carry an upstanding bracket-like support 14 between which is mounted a pair of rubber rollers 15—15' arranged vertically and through which the web W is fed. Mounted on the right-hand bracket 14, see Fig. 4, is a platform 16 which supports an electric motor M that drives through a belt 17 a pulley 18 on roll 15'. Pivoted about the roll 15' is a pair of oppositely extending arms 19—19 which are connected together by a transverse bar 19' at one end and support at the other end a driven roll 20. Roll 20 is driven through a suitable belt 21 which is connected to a pulley 21' on roll 15' and is therefore driven by the motor M. Suitable weights 22 placed on the arms 19 counterbalance the drive roll 20. A right angle bracket 23 is attached to the left-hand upstanding bracket 14 of the frame, see Fig. 3, and it supports a pair of limit switches ls1 and ls2.

Limit switch ls1 is connected in circuit with the motor M and as the roll V of vinyl stock unrolls under the influence of the drive roll 20, arm 19 is lowered as the roll V becomes smaller. Before roll V is fully unrolled, arm 19 contacts limit switch ls1, speeding up motor M and in turn roll 20 and roll V so that the web W is run off at a greater speed than is demanded by the drier. A stock of web is accumulated in bin 24 so that a new roll of stock may be spliced onto the end of the web on roll V. Arm 19 pivots downwardly as the stock on roll V is diminished and finally arm 19 strikes limit switch ls2 whereupon motor M is stopped. This permits the operator to pull off the end of the stock on roll V and insert a new mandrel with a new roll of stock and splice on the end of the web of the prior roll. This is accomplished without shutting down the continuous operation of the drier which is at the rate of about 41 feet per minute. Also mounted on the frame 10 as shown in Fig. 3 are a pair of inductance coils generally indicated at 25 and 26 having an armature 27 which is connected at its upper end in a pivotal manner to an operating lever 28 pivoted at 28' on frame bracket 14. Pivoted arm 28 is connected by an intermediate link 29 by a pivot means at each end to one of a pair of tension sensing arms 30 pivoted to bracket 14 as at 31. Arms 31 of the sensing mechanism support at one end a metal roller 32, at the other end a crossbar 33 which carries counterweights 33', see Fig. 4. Roller 32 rides on web W as shown in Fig. 1 and through the tension arm 30, the linkage 29 and 28 moves armature 27 which controls the solenoids 25 and 26 which respectively speed-up and slow-down motor M depending on the tension set for web W. On the upper portion 14' of bracket 14 is mounted a limit switch ls3 which is in line with one of the pivot arms 30. Upon an extreme tension being applied to web W, arm 30 pivots upwardly and contacts limit switch ls3 which is connected in a trip circuit with the motor M and the drive motors on the drier, washer and conveyor as will hereinafter be described. Thus, to prevent the web W from breaking when an extreme tension is placed thereon, limit switch ls3 shuts down the continuous feed of the web through the normally continuously operating machine.

Drier

The web W is next fed through a drier generally indicated at 40 which has a pair of associated guide rolls 41 and 42 between which the web W is trained and then over a plurality of vertically spaced and horizontally offset alternate rollers 43. The drier is formed in Fig. 5 with vertically extending compartments 44 and 45 at either side and at the ends of rolls 43. Each of the compartments 44 and 45 has steam coils 46 therein which supply heat for heating air circulated by the banks of fans 47 and 48 mounted in the upper ends of the heating compartments 44 and 45. This heated air is circulated through the drier section proper indicated at 49 where the web trained over the rollers 43 is subjected to the heated air. Constant temperature of the air is maintained by control means (not shown). Exhaust ducts 50 and 51 are connected respectively to the heating chambers 44 and 45 and air is exhausted to the outside by means of an exhaust blower generally indicated at 52. The drier serves to remove moisture from the vinyl web and also small amounts of volatile material as the web passes therethrough at a rate of about 41 feet per minute.

First cooling chamber and conveyor

The web W after leaving the drier 40 is carried by a conveyor generally indicated at 60 through a horizontally disposed cooling chamber 61. The conveyor 60 is of the endless belt type having transverse slats and cork strips attached to the slats to support the web W.

Variable speed drive

A variable speed drive is generally indicated at 70 in Figures 1a and 8. An electric motor M2 drives the variable speed drive mechanism 70 which has an output shaft 71 mounting a drive pulley 71' which drives through a belt 64. A pulley 65 on the right-hand end shaft 66 of conveyor 60 as shown in Figure 1 has a pulley 62 over which is trained a belt 63 which drives the drier rollers 43. Drier rollers 43 are interconnected by a common drive 54. Still referring to Figure 8 the variable speed drive mechanism 70 includes a pair of split pulleys 72 and 72' controlled by the arm of 73 in turn pivotally connected to the screw member 74 through a nut 74'. Screw member 73 is in turn driven by a belt 75 connected to a reversible small drive motor M76. Limit switches 77 and 78 are associated with the screw member 74 so that a follow-up member 74' on a screw member 74 will move to the extreme limits of screw member 74 and actuate either limit switch 77 or 78 to reverse motor 76. Motor M76 is connected to a photoelectric cell tension control mechanism as shown in Figure 1a and in more detail in Figure 9.

Tension control mechanism

A photoelectric cell tension control mechanism is generally indicated at 80 in Figure 1a. Web W passes over a counter balanced roller 81 guided in vertical movement between a pair of vertically disposed and spaced apart support members 82 and 83, at the right hand of the first cooler 61 and in position therebelow. Roller 81 is counter-balanced by a weight 84 connected by a flexible strap 85 which is led over an idler roller 86 mounted adjacent the top end of the vertical supports 82 and 83. Additional vertical support members 87 and 88 are positioned respectively on opposite sides of the vertical supports 82 and 83 at each end of the web as shown in Figures 1a and 6. Vertical support 87 carries a light source 89 while the vertical support 88 carries a sensing element 90 as an upper limit scanning means for the web W. A lower scanning means for the web W comprises a light source of 91 mounted below light source 89 on the vertical support 87 and a photoelectric sensing receiver at 92 mounted below sensing element 90 on vertical support 88.

Figure 9:
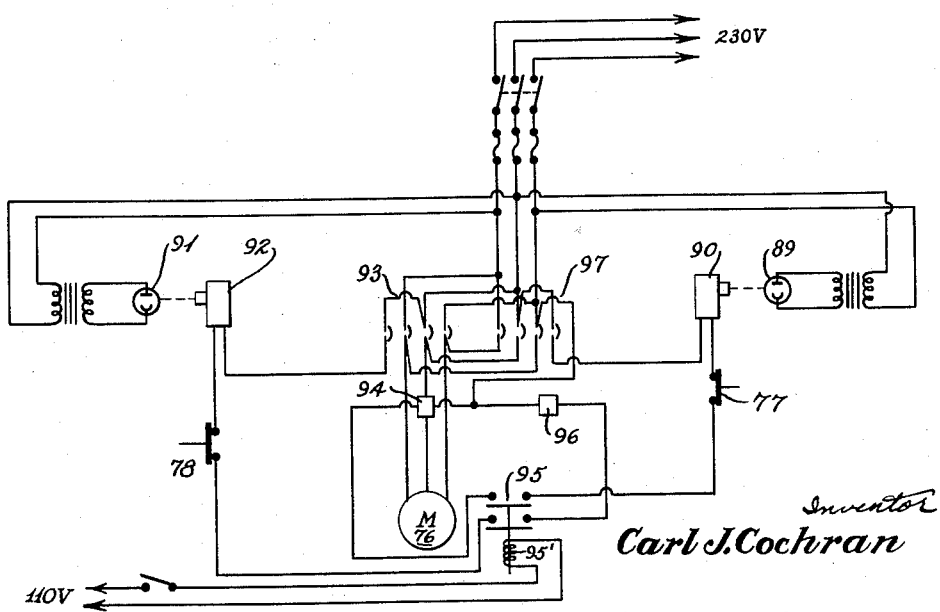
Fig. 9 is a circuit diagram of the tension control mechanism and its control of the variable speed drive shown in Fig. 8.

In Figure 9 there is shown a circuit diagram of the photoelectric sensing mechanism and its control of the reversible drive motor M76 for the variable speed drive control. Motor M76 is energized by a starter box 93 connected to a power source and actuated by a solenoid 94 when switch 95 is closed by its relay 95' and when limit switch 77 is closed. This occurs when the roller 81 has risen so that light source 89 impinges on photoelectric sensing mechanism 90. As soon as the lever 73, see Figure 8, is moved by the nut 74' to contact limit switch 77, switch 77 is opened and the motor M76 is stopped.

For the reverse rotation of the motor M76, the solenoid 96 controlled by the photosensing mechanism 92 actuates the starter switch 97 and it moves the nut 74' on screw 74 until limit switch 78 is opened which controls the downward movement of the roller 81.

Washer

After the web W leaves the tension mechanism control 80 it passes into a washer generally indicated at 110 having a vertically disposed soft water tank 111 and a second vertically disposed cold water spray tank 112. The first tank 111 has a pair of spaced apart guide rolls 113 and 114 mounted on top of the washer and a bottom idler roll 115 over which the web is trained.

In the washer tank 112 web W is led over a top guide roll 116 and a pair of spaced apart bottom rolls 117—117 thence it passes vertically upward between oppositely positioned pairs of cold water spray heads 118 and out through a pair of rubber wringer or water stripping rolls 119 and 120. The wringer rolls 119 and 120 are pressed together by a suitable pneumatic actuator generally indicated at 121. Still referring to the washer 110, the vinyl sheeting passing through the warm soft water bath has traces of chemical material removed therefrom such as bicarbonate of soda. The water is sufficiently warm to readily dissolve any chemical deposits on the surface of the web. In the washer section 112 the cold softened water from the spray heads 118 washes off the sheet and cools the web. This water is below room temperature. As the web W passes through the wringer rolls 119 and 120, it is led over a guide roll 123 mounted on the tower 122.

*Drying and cooling conveyor*

As the web W leaves the washer 110, it passes over an endless conveyor generally indicated at 130 which has rolls 131 and 132 mounted at each end. This conveyor inclines from above the washer 110 downwardly and is made up of stainless steel slats 130'. Conveyor 130 is powered by a variable speed drive mechanism 133 having a motor M3 mounted on a framework generally indicated at 134. Variable speed drive 133 drives a pulley 135 attached to roll 131 by means of a belt 136 at the lower end of the conveyor 130. Roll 132 at the upper end of conveyor 130 has a drive pulley 137 over which is passed a belt 138 which drives the roller 123 on the washer 110. Associated at the upper end of the conveyor 130 is a pair of oppositely disposed heater elements 139 and 140 that direct heat against the upper and lower surfaces of web W to remove traces of moisture and also to relax the web as is indicated by the draping of the web at 141 over the stainless steel slats 130'. A blower element 142 is mounted between the runs of the conveyor at the lower end and blows cold air from the blower room up against the lower surface of the web on its leaving the conveyor 130. This blast of air removes further water and tends to straighten the web.

*Cold air conditioning room and conveyor*

A cold air conditioning conveyor is generally indicated at 160 and this is positioned in a room whose left-hand wall is generally indicated by the broken vertical line 161 and the right-hand wall by the broken vertical line 162. Housed in this room is an endless conveyor 163 disposed in a horizontal position on the vertical support frame work 164—165. At the left-hand end of the conveyor 163 the spaced apart vertical supports 164 serve as guides for a slide member 166 which has attached a vertically extending shaft 167 carrying a vertically extending framework 168 in which is housed a dancer roll 169. Framework 168 has attached at its upper end a flexible strap 170 which passes over an idler pulley 171 while the other end of the strap is attached to a counterweight 172. Thus, as the web W leaves the drying and cooling conveyor 130 it is trained about the dancer roll 169 and over an idler roll 173 onto the endless conveyor 163. When the press 180, to be described, is actuated the web is stopped at the press and thus tends to back up and the dancer roll 169 in its housing will move downwardly to take up the feed of the web during the up and down vertical movement of the press. At the right-hand end of the third drying and cooling conveyor 163 there is disposed the cold air blower outlet housing 174. This cold air conditioning room and the air supplied by the cold air blower through the housing 174 tends to chill the web and further set it before inserts are cut therefrom.

*Die press*

A die press is generally indicated at 180 and it has an upper die member 181 mounted in the movable head. The cutting dies are set in plywood (not shown) attached to the head 181. A pair of in-running feed rolls 182—182 are mounted at the left-hand end of the press while a pair of pull rolls 183—183 are mounted at the right-hand end of the press. The press is powered by an electrical motor drive M1 and a suitable control provides for intermittent operation of the press wherein the feed rolls 182—182 and 182—182 move a length of the web under the press head 181 while the head is up and then interrupts its movement while the head moves down cutting out an insert according to pattern form. The insert stays put in the web and is stripped from the web at the takeoff conveyor station generally indicated at 200. As the web W leaves the press rolls 183—183, it passes through a second dancer roll station 190. The second dancer roll station 190 comprises a vertical framework 191 and the web is led over an idler roll 192 mounted on top of the framework 191, thence down over the second dancer roll 193 which is mounted in a pair of spaced apart vertical supports 193—194 by means of a transverse slidable frame 195 having a weight 196 attached to the bottom thereof. As the web W leaves the dancer roll 193, it passes between a pair of idler rolls 197 and 198 and thence on to the takeoff or fourth conveyor 200. Conveyor 200 is of the endless belt type also made of stainless steel belting as generally indicated at 201 which passes over end rolls 202 and 203. Roll 203 has a pulley 204 over which is led a belt 205 to the variable speed drive mechanism 206 which is driven by a motor M4. Attached to roll 202 is a pulley 207 over which is trained a drive belt 208 to a drive pulley 209 which drives roll 197. As the web is stopped for a press operation, the drive mechanism 206 continues to operate and tends to pull the web along. The dancer roll 193 is at the lower position in the framework 194—194 as the press starts a cut and interrupts the movement of the web W. The dancer roll 193 moves up the framework 194—194 towards the top during the press operation. As a new strip of web is intermittently fed through the press 180, the dancer roll 193 moves downward to its normal lower position for another cycle of cutting operation. The web W carried by the takeoff conveyor 200 is then stripped of the excess material and the inserts are removed and stacked.

By consecutively treating the vinyl web stock a uniform clean surface web is provided. Inserts are cut from this web immediately after it has been prepared by the steps provided in the process. These inserts are of uniform size and clean hardened surface quality which is necessary for inserts used in laminated glass fabrication. The process as here developed for the treatment of the vinyl web stock has reduced the rejects to a minimum. The apparatus for continuously preparing the vinyl web has greatly reduced the prior separate operation costs and at the same time has reduced the space required for carrying out the operations.

I claim as my invention:

1. The method of continuously preparing vinyl insert sheets for safety glass from a vinyl web which comprises the steps of feeding the web from a roll of vinyl stock to a drying zone, drying the web to remove moisture and traces of volatile material, cooling the web after it has been heated and dried, next washing the web in a warm bath of softened water to soften the same and remove traces of chemical deposits on the web, rinsing the web with cold softened water, stripping the web of liquid to dry the same, conveying the web while subjecting it to heat to remove moisture and to relax it from any stretching occurring to same in its prior treatments, applying air blasts to the web to remove further moisture and to straighten the web as it is being conveyed, and conveying the web through a cold zone to chill and set the web before cutting.

2. The method of continuously preparing vinyl sheets for safety glass according to claim 1 including the cutting out of inserts from the web in pattern form and then stripping the cut inserts from the rest of the web.

3. The method of continuously preparing vinyl insert sheets for safety glass from a vinyl web which comprises feeding the web from a roll of vinyl stock to a drying zone, drying the web to remove moisture and traces of volatile material, cooling the web after it has been heated and dried, next washing the web in a warm bath of softened water to soften the same and remove traces of chemical deposits on the web, rinsing the web with cold softened water, stripping the web of liquid, conveying the web while subjecting it to heat to remove moisture and to relax it from any stretching occurring to same in its prior treatments, conveying the web through a cold zone to chill and set the web before cutting, cutting out inserts from the web in pattern form and stripping the cut inserts from the rest of the web after they have been cut therefrom.

4. The method of continuously preparing vinyl insert sheets for safety glass from a vinyl web which comprises the steps of feeding the web from a roll of vinyl stock to a drying zone, drying the web to remove moisture and traces of volatile material, cooling the web while applying a uniform tension after it has been heated and dried, next washing the web in a warm bath of softened water to soften the same and remove traces of chemical deposits on the web, rinsing the web with cold softened water, stripping the web of liquid to dry the same, conveying the web while subjecting it to heat to remove moisture and to relax it from any stretching occurring to same in its prior treatments, applying air blasts to the web to remove further moisture and to straighten the web as it is being conveyed, and conveying the web through a cold zone to chill and set the web before cutting.

5. The method of continuously preparing vinyl insert sheets for safety glass from a vinyl web which comprises feeding the web from a roll of vinyl stock to a drying zone, drying the web to remove moisture and traces of volatile material, cooling the web while applying a uniform tension after it has been heated and dried, next washing the web in a warm bath of softened water to soften the same and remove traces of chemical deposits on the web, rinsing the web with cold softened water, stripping the web of liquid, conveying the web while subjecting it to heat to remove moisture and to relax it from any stretching occurring to same in its prior treatments, conveying the web through a cold zone to chill and set the web before cutting, cutting out inserts from the web in pattern form and stripping the cut inserts from the rest of the web after they have been cut therefrom.

References Cited in the file of this patent

UNITED STATES PATENTS

| | | |
|---|---|---|
| 2,156,680 | Dennison | May 2, 1939 |
| 2,360,650 | Crane | Oct. 17, 1944 |